US007444586B1

(12) United States Patent
Wormley

(10) Patent No.: US 7,444,586 B1
(45) Date of Patent: Oct. 28, 2008

(54) INHIBITING SPACE COMPRESSION OR EXPANSION IN AUTOMATED PARAGRAPH LAYOUTS

(75) Inventor: Matthew A. Wormley, San Luis Obispo, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1056 days.

(21) Appl. No.: 09/859,348

(22) Filed: May 16, 2001

Related U.S. Application Data

(63) Continuation-in-part of application No. 09/670,761, filed on Sep. 27, 2000.

(51) Int. Cl.
*G06F 17/00* (2006.01)

(52) U.S. Cl. ...................... 715/245; 715/256

(58) Field of Classification Search ............... 715/517, 715/519, 518, 531, 243, 245, 256
See application file for complete search history.

(56) References Cited

U.S. PATENT DOCUMENTS

| | | | | |
|---|---|---|---|---|
| 3,654,611 | A * | 4/1972 | Bluethman et al. | 358/1.18 |
| 4,054,948 | A * | 10/1977 | Grier et al. | 345/467 |
| 4,575,813 | A | 3/1986 | Bartlett et al. | |
| 4,608,664 | A | 8/1986 | Bartlett et al. | |
| 4,773,009 | A * | 9/1988 | Kucera et al. | 715/531 |
| 4,783,760 | A * | 11/1988 | Carosso | 715/519 |
| 5,224,038 | A | 6/1993 | Bespalko | |
| 5,835,920 | A | 11/1998 | Horton | |
| 5,978,819 | A | 11/1999 | Berstis | |
| 6,018,749 | A | 1/2000 | Rivette et al. | |
| 6,044,383 | A | 3/2000 | Suzuki et al. | |
| 6,189,020 | B1 | 2/2001 | Shimizu | |
| 6,223,191 | B1 * | 4/2001 | Truelson | 715/517 |
| 6,279,018 | B1 | 8/2001 | Kudrolli et al. | |
| 6,948,119 | B1 | 9/2005 | Farmer et al. | |

OTHER PUBLICATIONS

Nagy, George, et al, "Two Complementary Techniques for Digitized Document Analysis", Proceedings of the ACM Conference on Document Processing Systems, Jan. 2000, pp. 169-176.*

Samet, Hanan, "Heuristic for the Line Division Problem in Computer Justified Text", Communications of the ACM, vol. 25, Issue 8, Aug. 1982, pp. 564-571.*

Peels, Arno J.H., et al, "Document Architecture and Text Formatting", ACM Transactions on Information Systems (TOIS), vol. 3, Issue 4, Oct. 1985, pp. 347-369*

(Continued)

*Primary Examiner*—Laurie Ries
(74) *Attorney, Agent, or Firm*—Fish & Richardson P.C.

(57) ABSTRACT

Programs, methods and apparatus for optimization of paragraph layouts, especially automated justified paragraph layouts. In one embodiment, the aggregate space expansion or compression necessary to achieve a particular length for a text line is first determined. In one embodiment, the length is the length of a fully justified line. Then a justification penalty is assessed to the line, the justification penalty being a function of at least a space expansion or compression and the number of inter-word spaces in the text line. Accordingly, the invention can be employed advantageously to inhibit visually unpleasant degrees of space compression or space expansion in fully justified paragraph layouts.

26 Claims, 1 Drawing Sheet

OTHER PUBLICATIONS

Iwai, I., et al, "A Document Layout System Using Automatic Document Architecture Extraction", ACM SIGCHI Bulletin, vol. 20, Issue SI, Mar. 1989, pp. 369-374.*

Sloman, Aaron, "VED Reference Manual", School of Cognitive and Computing Sciences, University of Sussex, downloaded from http://www.rdg.ac.uk:8081/cgi-bin/cgiwrap/wsi14/poplog/pop11/doc/vedmanual, Mar. 1990, pp. 1-69.*

Knuth et al., "Breaking Paragraphs into Lines," *Software-Practice and Experience*, vol. 11,, pp. 1119-1184, Feb. 1981.

Stephens, "Ready-to-Run, Visual Basic Algorithms," Second Edition, *Wiley Computer Publishing*, pp. 117-153, 155-185.

URW hz-program, "Micro-typography for advanced typesetting," *URW Software & TypeGmbH*, Hamburg, Germany, 1993, 1-38.

* cited by examiner

INHIBITING SPACE COMPRESSION OR EXPANSION IN AUTOMATED PARAGRAPH LAYOUTS

CROSS-REFERENCE TO RELATED APPLICATION

This application is a continuation-in-part application of, and claims priority under 35 U.S.C. § 120 to, co-pending and commonly-owned U.S. patent application Ser. No. 09/670,761, entitled "Automated Paragraph Layout," filed Sep. 27, 2000.

BACKGROUND

The invention relates to the computational evaluation of the effect of compression or expansion of spaces between words in paragraph layouts such as automatic justified paragraph layouts.

Paragraph layout in a document production application involves selection of various format parameters so as to give the paragraph a visually pleasing appearance. Format parameters that significantly affect the aesthetic quality of a paragraph include line breaks, justification, widow-orphan control, hyphenation, and paragraph shape. Particular combinations of such format parameters can cause a paragraph to have a visually unappealing appearance. It is therefore desirable to control the manner in which format parameters are applied to a paragraph to ensure that the paragraph has an optimally attractive layout.

Techniques for automated paragraph layout are described in co-pending U.S. application Ser. No. 09/670,761, entitled "Automated Paragraph Layout," filed Sep. 27, 2000, and No. 09/799,195, entitled "Inhibiting Hyphenation Clusters In Automated Paragraph Layouts," filed Mar. 5, 2001, both of which are incorporated here by reference. According to the described techniques, potential line layouts can be determined and analyzed against format metrics. Penalties applied to each potential line layout can be proportional to the degree to which a layout departs from or violates one or more format metrics, such as hyphenation clustering. An optimized paragraph layout can be identified by determining the line layout combination having the lowest aggregate penalty.

The manner in which lines are broken in a justified paragraph can have a particularly significant effect on the overall visual appearance of a paragraph. If in a fully justified paragraph lines are broken so that only few words occur on each line, large spaces will occur between each word to the detriment of the aesthetic quality of the paragraph. Similarly, breaking lines so that too many words occur on each line causes the spaces between each word to be unduly compressed, which likewise detracts from the aesthetic appearance of the layout.

Several techniques exist to control the manner in which lines are broken and justified. Some text layout optimization programs determine the total distance, or "shortfall," between the last word in a potential line and the right margin and assess a justification penalty proportional to the magnitude of the shortfall. Where compression is necessary to fit a selected number of words onto a line, the total compression needed to justify the line is measured. Some programs calculate the total expansion or total compression necessary to justify a line after the line has been subject to standard degrees of space compression or expansion. For example, the total compression necessary to justify a line may be determined after the line has already been subjected to low, moderate or high space compression. With respect to another line, the program may calculate a total shortfall necessary to justify the line after the line has been subjected to a low, moderate or high degree of space expansion.

SUMMARY

The invention features methods and apparatus, including computer program products, for evaluating line layouts and optimizating automated paragraph layouts, especially justified paragraph layouts. The invention can be employed advantageously to inhibit, among other things, visually unpleasant degrees of space compression or space expansion in paragraph layouts.

In one embodiment, a computer program product determines the aggregate spacing or compression necessary to lay out a text line having multiple consecutive words to achieve a particular line length and then determines a justification penalty that is a function of at least the aggregate spacing or compression and the number of inter-word spaces in the text line.

In another embodiment, justification penalties are determined for multiple text lines in a paragraph layout.

In another embodiment, an aggregate penalty is determined for the paragraph layout, the aggregate penalty being a function of at least the justification penalties assessed against multiple lines within the paragraph layout and an additional penalty associated with another format parameter such as hyphenation.

In another embodiment, a program identifies one or more alternative paragraph layouts in which one or more text lines contain different numbers of words relative to a previous paragraph layout and determines justification penalty values for multiple text lines associated with multiple alternative paragraph layouts.

In another embodiment, the aggregate spacing or compression in the optimal paragraph layout is allocated among inter-word spaces, inter-character spaces, and font width on a line-by-line basis according to selected weighting constants and then the final paragraph layout is displayed to a user.

In another embodiment, a system identifies multiple possible text lines associated with multiple alternative paragraph layouts, determines the aggregate spacing or compression that would right justify each of a plurality of the possible text lines, assigns a justification penalty to those text lines, combines at least the justification penalties associated with at least some the text lines for each of the alternative paragraph layouts, and identifies the paragraph layout having the lowest aggregate penalty value.

Various embodiments of the invention can be implemented to realize one or more of the following advantages. Certain embodiments can rank or rate a variety of possible text lines or paragraph layouts in terms of their aesthetic appeal. Still other embodiments can aid in the identification of paragraph layouts having the best overall aesthetic appeal, considering not only justification but also additional format parameters such as hyphenation, widow/orphan control, paragraph shape and other metrics. Certain embodiments can also enable users to control the sensitivity of layout optimization programs to justification and other format parameters. Other embodiments can allocate the aggregate expansion or compression among the inter-word spacing, inter-character spacing, and font width to develop a final optimized paragraph layout. Embodiments of the invention can be readily combined with other paragraph optimization and format penalty techniques to provide an improved system for evaluating or optimizing the visual appeal of a paragraph.

The details of one or more embodiments of the present invention are set forth in the accompanying drawings and the description below. Other features and advantages of the present invention will be apparent from the description and drawings, and from the claims.

DETAILED DESCRIPTION

Figure 1:
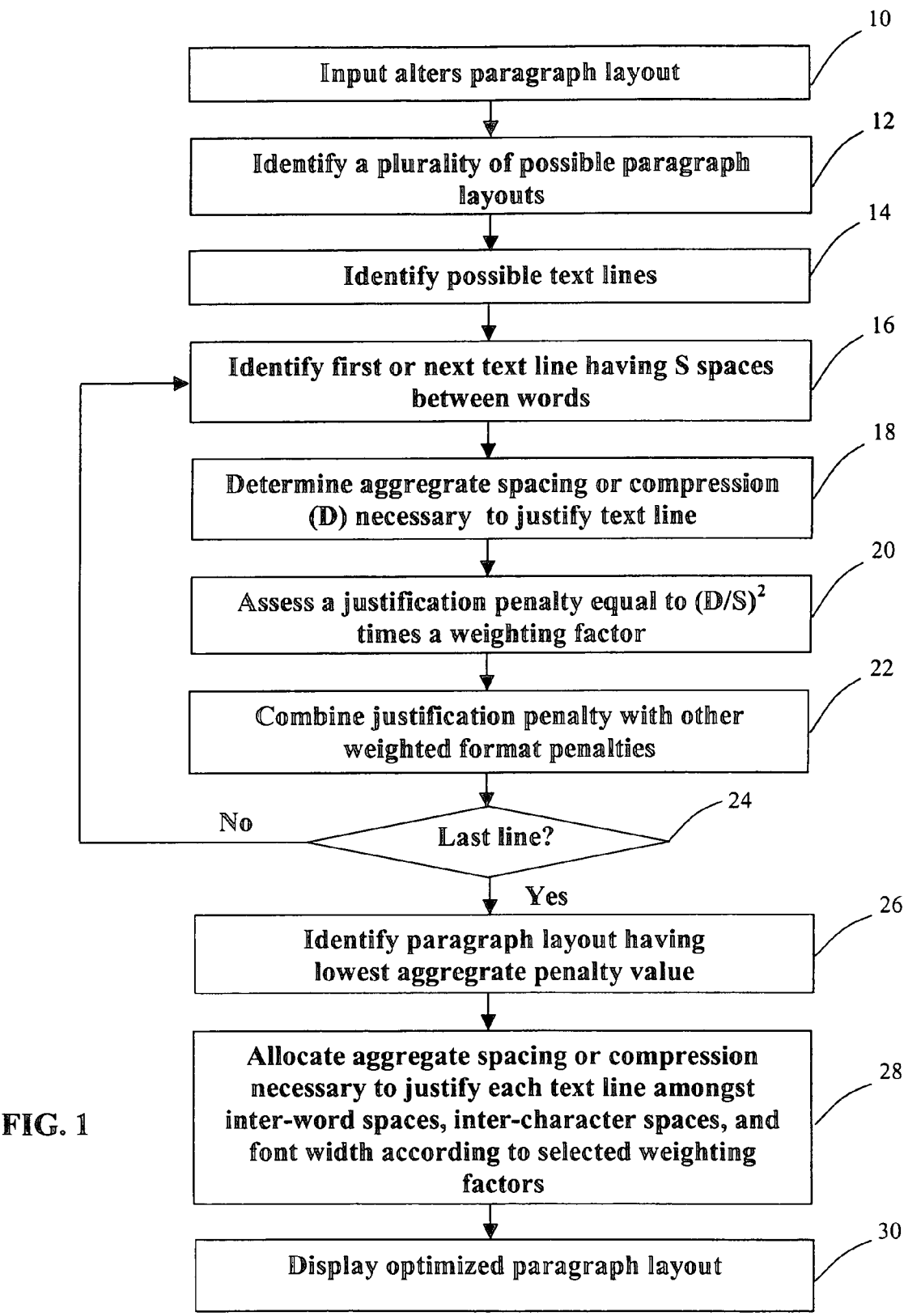
FIG. 1 is a flow diagram illustrating a technique for penalizing space compression or space expansion in a justified paragraph layout and selecting an optimized justified paragraph layout.

FIG. 1 illustrates an embodiment of the present invention adapted for implementation in a computer program product tangibly stored in a machine-readable storage device. The technique of FIG. 1 is initiated by the input of text, modification of a format parameter, or other alteration of a paragraph. The program then identifies possible combinations of text lines that can be used to build a new paragraph layout. For each, but not necessarily every, possible text line the program determines the number of inter-word spaces and the total space expansion or compression necessary to fit the text to the justified margins. Each line is assessed a justification penalty equal to the square of the quotient of the total space expansion or compression divided by the number of inter-word spaces. The justification penalty is combined with other format related penalties assessed against the text line, e.g., penalties associated with hyphenation clustering. Each of the penalties is weighted according to selected factors and then summed to arrive at an aggregate penalization value for the line. This process is repeated for other potential text lines that are considered candidates for an optimized paragraph layout. The program then selects the paragraph layout that consists of the combination of potential lines having the lowest aggregate penalty. A revised paragraph is created by allocating the aggregate spacing or compression necessary to justify each text line among inter-word spaces, inter-character spaces, and font width according to selected weighting factors.

Steps 10-30 of FIG. 1 will now be described in more detail. The paragraph optimization protocol can be triggered by "damage" to the format of the paragraph (10). Such damage can be caused by a user typing a character or word at the end of a paragraph or anywhere in the body of the paragraph. Damage might also be caused by altering format parameters such as font characteristics, inter-line spacing, widow/orphan control, hard line breaks, or the like. The protocol can also be initiated by an automated modification of text or one or more format related parameters in a line or paragraph. Alternatively, the procedure can run on a timed interval or be automatically triggered by other suitable means.

The program next identifies possible paragraph layouts (12). The technique described in aforementioned co-pending U.S. application Ser. No. 09/670,761 creates a possibility tree of potential text line combinations. A text line can optionally be included in the tree if the line includes words that can be fit within the specified margins, or "baseline width," at a selected maximum compression of inter-word spacing, inter-character spacing, and font width. A pruning operation can be advantageously employed to eliminate branches of the possibility tree. For example, the program may in real time determine justification penalties at each branch of the possibility tree and terminate further expansion of a branch after a threshold penalty is exceeded. The penalty calculation for each of the possible lines may be based on the width of the respective line relative to the width of an applicable "baseline" within the page. A baseline defines an area for placement of textual information, and has a finite height and length. In general, a baseline is a horizontal rectangle that describes the position for layout of a line of text, measured from the top of the paragraph cell. Notably, the width of the applicable baseline may vary between different baselines. For instance, an object such as a photograph, table or graph may be positioned within the paragraph, in which case the text lines of varying width "wrap" or flow around the object. Other known techniques for creating a possibility tree scan forward from each word on a word-by-word basis to determine every possible combination of words and line breaks which would occur thereafter. The "forward scan" process is repeated for each successive word in the paragraph. According to these or other suitable techniques a plurality of possible text lines are identified (14).

Starting with the first text line, the program identifies the number of words in the text line (16). The number of inter-word spaces (S) in a text line is ordinarily the number of words minus 1. The program can also optionally identify and store the number of inter-character spaces, font width, or other format parameters so that the protocol can thereafter factor those variables into justification penalties and other penalties that are assessed against the text line. Those variables can also optionally be employed in connection with the allocation of shortfalls or compression amongst inter-word spaces, inter-character spaces, and font width, as will be described in more detail below.

The program then calculates the total space expansion or space compression (D) necessary to fit the words to predetermined margins (18). For instance, if the words of a candidate text line fall 75 points short of the margin, the total space expansion necessary to justify the line is 75 points. This can also be referred to as the total or aggregate shortfall. Conversely, if the words exceed the margins by 75 points, D will be negative 75 (–75) points. It is advantageous for the possible text lines compiled in step 14 to include text lines having predetermined standard degrees of inter-word, inter-character, and font width expansion or compression. For instance, the program can first identify all possible line combinations based upon standard inter-word spacing, inter-character spacing, and font widths and then identify additional possible line combinations if a given level of compression is applied to the inter-word spacing, inter-character spacing, and font widths. In such embodiments, the space compression or expansion (D) needed to justify each line is also calculated for such pre-compressed or pre-expanded text lines. The program can include limits or cut-offs concerning the degree to which inter-word spacing, inter-character spacing, and font widths are compressed or expanded. Such limits can be used, for example, to prune text lines that exceed those limits from the possibility tree.

A justification penalty is assessed to each text line that is a candidate for inclusion in an optimized paragraph layout (20). The penalty is a function of not only the space compression or expansion (D) needed to justify the line but also the number of inter-word spaces in the line (S). In one embodiment, the penalty is equal to $(D/S)^2$. Optionally, this penalty can be multiplied by a weighting factor that effectively increases or decreases the importance of the justification penalty relative to other format parameter penalties. The justification penalty need not be assigned to a node or line. For instance, the justification penalty for a particular line can be calculated and summed in connection with a running tally of penalties in the word-by-word "forward scan" technique described above. Moreover, there is no need to calculate a penalty for every possible text line. Pruning operations or other techniques can be used to limit the number of text lines for which penalties are calculated.

The justification penalty for each line can be combined with other penalties associated with other format parameters (22). For instance, the hyphenation penalization technique described in co-pending U.S. application Ser. Nos. 09/670,761 and 09/799,195 can be implemented to assess penalties associated with "hyphenation clustering," or the number of line-ending hyphens that occur in neighboring or proximate lines. Format penalties can also be applied for parameters such as widows/orphan control and paragraph shape. Such penalties can be weighted according to selected constants before being combined with the justification penalty. Accordingly, the program can be customized to have a preferred sensitivity to each of the various format parameters and metrics. As explained above, it is not necessary to assign the penalties to a given word, line, or other node unless the selected method of penalty aggregation implies such a requirement.

The foregoing steps 16, 18, 20, and 22 are repeated for each text line that is a candidate for inclusion in the final optimized paragraph layout (24). In embodiments including a possibility tree pruning function, the processing demands for iterative step 24 are generally reduced. If a word-by-word forward scan is employed, justification and other penalties can be determined and assessed on a word-by-word, rather than line-by-line, basis.

The protocol then selects the combination of text lines having the lowest total penalty (26). This combination is the optimized paragraph layout, which in turn can dictate what words will occur on each line and where the line breaks will occur. Optionally, the program can be used to identify a number of optimized paragraph layouts that have acceptable and comparable justification and other format penalties. The subset of layouts can then be evaluated against other metrics or format requirements to determine a preferred paragraph layout.

After a paragraph layout has been selected, the program can allocate the aggregate spacing or compression (D) among inter-word spaces, inter-character spaces, font width, or other physical line dimensions (28). In one embodiment, the distance D necessary to justify each line can be evenly spread across all inter-word spaces S by compressing or expanding all of the spaces equally. Alternatively, the inter-character spacing, font width or other physical line dimensions can be adjusted to reduce or eliminate the extent to which the inter-word spaces S must be compressed or expanded to accommodate distance D.

Advantageously, the program can allocate the distance D among the S inter-word spaces, inter-character spacing, font width and other dimensions according to selected weighting factors. A user or programmer can thereby customize the manner in which the protocol adjusts for shortfalls, for example.

The optimized paragraph layout can then be displayed to a user (30). To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The above illustrative example was directed primarily to a paragraph layout for which full justification was specified. Optionally, the invention can be implemented in connection with paragraphs having only left, center, or right justification. For example, where an automated paragraph layout protocol only partially justifies a text line, the justification penalty described above may be usefully employed to inhibit selection of a visually unappealing layout. As a further example, it may be desirable to inhibit selection of left justified paragraphs having a high ratio of total shortfalls to inter-word spaces S.

The present invention may be used to detect the degree of space compression or expansion necessary to effectuate justification without actually assessing any justification penalty. Such information is useful as a metric, among other things. The technique described above can also be readily combined with other format optimization techniques as a justification module or subroutine.

By use of these techniques, paragraph layouts having an optimized layout can be identified efficiently. The optimal layout can be selected based not only on the degree of space compression or expansion necessary to effectuate justification, but also on the number and mutual proximity of the hyphens, occurrence of widows and orphans and other format parameters and metrics.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the present invention have been described. Nevertheless, it will be understood that various modifications may be made without departing from the spirit and scope of the invention. For example, the justification penalty calculation can be used to calculate a penalty—or, more generally, a figure of merit—for a compression or expansion of a particular line of text to a desired line length even where the desired length is not a full justification line length. For example, when creating a paragraph layout with a ragged right margin, it may be desirable to have all lines end within a predefined distance of a right margin line. The justification penalty can be used to determine whether a possible compression or expansion to meet such a condition would have an acceptable appearance. This determine can be made by comparing the penalty to a predetermined threshold value. In addition, the principles of the invention can be applied to layouts involving elements that are not conventionally considered words, such as graphics elements or elements of a mathematical equation. Accordingly, other embodiments are within the scope of the following claims.

What is claimed is:

1. A computer program product, tangibly stored on a computer-readable medium, for evaluating line layouts, comprising instructions operable to cause a programmable processor to:
   determine an aggregate space expansion or space compression that would lay out a text line having a plurality of consecutive words to a particular length; and
   determine a justification penalty, the justification penalty value being a function of at least the aggregate space expansion or space compression and the number of inter-word spaces in the text line.

2. The computer program product of claim 1, further comprising instructions to determine justification penalties for a plurality of text lines in a paragraph layout.

3. The computer program product of claim 2, further comprising instructions to determine an aggregate penalty for the paragraph layout, the aggregate penalty being a function of at least the justification penalties assessed against a plurality of lines within the paragraph layout.

4. The computer program product of claim 3, wherein the aggregate penalty is also a function of a penalty associated with at least one additional format parameter.

5. The computer program product of claim 4, wherein the aggregate penalty is determined by weighing the justification penalty against the penalty associated with at least one additional format parameter according to a selected weighting factor.

6. The computer program product of claim 2, further comprising instructions to:
   identify one or more alternative paragraph layouts in which one or more text lines contain a different number of words relative to a previous paragraph layout; and
   determine justification penalty values for a plurality of text lines associated with a plurality of alternative paragraph layouts.

7. The computer program product of claim 6, further comprising instructions to determine aggregate penalties for a plurality of the alternative paragraph layouts, the aggregate penalties being a function of at least the justification penalties assigned to a plurality of lines within the respective paragraph layouts.

8. The computer program product of claim 1, wherein the justification penalty is related to the inverse of the number of inter-word spaces by a power function.

9. The computer program product of claim 1, wherein the particular length is a full justification length.

10. The computer program product of claim 1, wherein the justification penalty value is equal to the square of the quotient of the aggregate space expansion or space compression divided by the number of inter-word spaces in the text line.

11. The computer program product of claim 1, further comprising instructions to allocate the aggregate space expansion or space compression among inter-word spaces and one or both of inter-character spaces and a font width.

12. A computer program product, tangibly stored on a computer-readable medium, for evaluating paragraph layouts, comprising instructions operable to cause a programmable processor to:
   identify a plurality of alternative paragraph layouts that are each associated with a respective plurality of possible text lines, wherein the possible text lines each include a plurality of consecutive words;
   determine an aggregate spacing or compression that would justify each of the possible text lines;
   assign a justification penalty value to each of the possible text lines, the justification penalty value being a function of at least the aggregate spacing or compression and the number of inter-word spaces in each respective possible text line;
   calculate an aggregate penalty value for each of the alternative paragraph layouts from the justification penalty values assigned to possible text lines in the plurality of possible text lines associated with the respective alternative paragraph layout; and
   identify a paragraph layout having a lowest aggregate penalty value.

13. A computer implemented method for evaluating line layouts, the method comprising:
   determining an aggregate space expansion or space compression that would lay out a text line having a plurality of consecutive words to a particular length;
   determining a justification penalty, the justification penalty value being a function of at least the aggregate space expansion or space compression and the number of inter-word spaces in the text line; and
   displaying on a display device one or more line layouts prepared in accordance with the justification penalty.

14. The computer implemented method of claim 13, further comprising the step of determining justification penalties for a plurality of text lines in a paragraph layout.

15. The computer implemented method of claim 14, further comprising the step of determining an aggregate penalty for the paragraph layout, the aggregate penalty being a function of at least the justification penalties assessed against a plurality of lines within the paragraph layout.

16. The computer implemented method of claim 15, wherein the aggregate penalty is also a function of a penalty associated with at least one additional format parameter.

17. The computer implemented method of claim 16, wherein the aggregate penalty is determined by weighing the justification penalty against the penalty associated with at least one additional format parameter according to a selected weighting factor.

18. The computer implemented method of claim 14, further comprising the steps of:
   identifying one or more alternative paragraph layouts in which one or more text lines contain a different number of words relative to a previous paragraph layout; and
   determining justification penalty values for a plurality of text lines associated with a plurality of alternative paragraph layouts.

19. The computer implemented method of claim 18, further comprising the step of determining aggregate penalties for a plurality of the alternative paragraph layouts, the aggregate penalties being a function of at least the justification penalties assigned to a plurality of lines within the respective paragraph layouts.

20. The computer implemented method of claim 13, wherein the justification penalty is related to the inverse of the number of inter-word spaces by a power function.

21. The computer implemented method of claim 13, wherein the particular length is a full justification length.

22. The computer implemented method of claim 13, wherein the justification penalty value is equal to the square of the quotient of the aggregate space expansion or space compression divided by the number of inter-word spaces in the text line.

23. The computer implemented method of claim 13, further comprising allocating the aggregate space expansion or space compression among inter-word spaces and one or both of inter-character spaces and a font width.

24. The computer-implemented method of claim 12, wherein the justification penalty value is solely a function of the aggregate space expansion or space compression and the number of inter word spaces in the text line.

25. A computer implemented method for evaluating line layouts, the method comprising:

identifying a plurality of alternative paragraph layouts that are each associated with a respective plurality of possible text lines, wherein the possible text lines each include a plurality of consecutive words;

determining an aggregate spacing or compression that would justify each of the possible text lines;

assigning a justification penalty value to each of the possible text lines, the justification penalty value being a function of at least the aggregate spacing or compression and the number of inter-word spaces in each respective possible text line;

calculating an aggregate penalty value for each of the alternative paragraph layouts from the justification penalty values assigned to possible text lines in the plurality of possible text lines associated with the respective alternative paragraph layout;

identifying a paragraph layout having a lowest aggregate penalty value; and displaying the paragraph layout on a display device.

26. A computer program product, tangibly stored on a computer-readable medium, for evaluating line layouts, comprising instructions operable to cause a programmable processor to:

determine an aggregate space expansion or space compression that would lay out a text line having a plurality of consecutive words to a particular length; and determine a justification penalty, the justification penalty value being a function of solely the aggregate space expansion or space compression and the number of inter-word spaces in the text line.

* * * * *

UNITED STATES PATENT AND TRADEMARK OFFICE
CERTIFICATE OF CORRECTION

| | | |
|---|---|---|
| PATENT NO. | : 7,444,586 B1 | Page 1 of 1 |
| APPLICATION NO. | : 09/859348 | |
| DATED | : October 28, 2008 | |
| INVENTOR(S) | : Matthew A. Wormley | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,423 days.

Signed and Sealed this

Eleventh Day of January, 2011

David J. Kappos
*Director of the United States Patent and Trademark Office*